Patented Aug. 25, 1953

2,650,165

UNITED STATES PATENT OFFICE 2,650,165

MILK-PAPAYA POWDERS, BEVERAGES MADE THEREFROM, AND METHODS OF PRODUCING THE SAME

Arnold S. Wahl, Chicago, Ill.

No Drawing. Application May 31, 1950, Serial No. 165,378

8 Claims. (Cl. 99—56)

The present invention relates to a new and improved dry product containing an active proteolytic enzyme. More specifically, the invention relates to dry products containing extractive substances of the fruit of the papaya tree possessing such an active proteolytic enzyme.

An object of the present invention is to provide a dry papaya fruit and milk extract possessing proteolytic enzyme activity.

Another object of the present invention is to provide a papaya fruit-milk extract in powdered form possessing proteolytic enzyme activity and capable of addition to ice cream, milk or other dairy and cream products and liquids, to form a novel beverage which pleases the taste, is healthful and not only is easily digestible but actually aids digestion.

The fruit of the papaya tree is an edible melon which has a delightful flavor and unusual health and digestive values and which is known to possess a papaya proteinase which is a powerful proteolytic enzyme which breaks down and hydrolyzes proteins and aids digestion in many ways.

However, although the papaya melon and its advantageous digestive properties are very well known and highly valued in the tropical world, its introduction in the raw state into nontropical areas has not been too successful, due mainly to the fact that the papaya is a very delicate fruit and is unable to survive the commercial handling and delays of ordinary shipment and transportation with the result that the raw papaya fruit has not become too popularly known in nontropical areas.

Another effort to realize upon such advantageous enzyme properties has been directed to the solution of the fresh latex drawn from the green melon which is known to possess this papaya proteinase also. However, due to the sensitivity of the proteolytic enzyme in the fresh latex or other solutions to oxidation, half of its proteolytic power is soon lost. It is believed that the crude enzyme mixture contains some substance which rapidly brings about the loss of potency. Attempts in this direction have not been too successful, either.

As a result, the usual methods of commercial utilization of the papaya fruit have not been directed to the ripe raw melon, or to the fresh latex derived from the green melon, but to extracts and products therefrom. One method of such commercial utilization has been to convert the ripe fruit into a concentrated syrup and to ship it in that form. Such a syrup is usually to be found in cans or other sealed containers and is usually available at the better grade establishments or in "health food stores."

During the usual conversion or processing into the concentrated syrup form, the fruit is crushed; the seeds are removed; sugar is normally added and then the mixture is heated and boiled at a high enough temperature and for a sufficient time to increase the consistency to the desired thick syrupy form.

This boiled syrup concentrate is then run off into the containers and sealed to be ultimately sold in such form. During this processing, however, even though a considerable portion of the original flavor was preserved and a palatable syrup presented to the market, I have discovered that a definite change has taken place.

The powerful proteolytic enzyme system which existed in the raw fruit is no longer present in proteolytically active form in the boiled papaya syrup concentrate. Its proteolytic activity has been destroyed or at least rendered completely and permanently inert and one of the most valuable attributes of the papaya fruit is gone. It is no longer an aid to digestion and many manufacturers or distributors who advertised the product as possessing digestive qualities, or containing "papain," or "vegetable pepsin," or "pepsin" were actually making misleading and extravagant claims concerning their product and were compelled, after due investigation by the government, to cease and desist such false advertising.

Another method of commercial utilization of the papaya fruit is to extract and dry the latex of the green melon to a powdered form known as papain. This method is as follows: the skin or peel of the green melon is cut into by means of several longitudinal scratches while the green fruit is still on the tree and the papaya latex will ooze forth from the melon through the scratches. The liquid latex drips into containers, rapidly coagulates and may be dried naturally in the air, or under vacuum conditions to yield a superior product.

The commercially developed preparations of the dried powdered papain possess proteolytic properties and are superior to the boiled papaya syrup concentrates which lack this valuable property; and are also preferred to the papaya latex in that the papaya proteinase in powdered form is considerably more stable and maintains its proteolytic powers for a longer time.

However, even the dried powdered papain loses its activity after storage for a period of time. For example, the percentage of naturally active enzyme present in vacuum dried papain, as compared to the the original activity of the fresh undried latex, remaining after storage of 45 days, has been determined to be 17%. Thus, even vacuum dried commercial papain preparations cannot be kept too long under normal conditions of storage.

Many efforts to prolong the life of the activity of the dried papain have been attempted but thus far complete success is unknown and papain cannot be maintained at full strength permanently.

The addition of such substances as sodium chloride or sodium monosulfide to the moist latex, prior to drying, has been attempted and some success has been noted toward maintaining the proteolytic activity at slightly higher percentages for increased periods of time. For example, the percentage of the artificially activated enzyme present in vacuum dried papain containing 10% of sodium monosulfide or 10% of sodium chloride, has been tested and determined to be of the order of 49% and 59%, respectively, after storage of 45 days.

This is, of course, a marked improvement but such advantages are of utility only where the addition of such salts is not objectionable as to taste in the end product. If the papain is to be used in the meat tenderizing or the like art, wherein salt would be used commonly, the advantages are capable of being realized upon. However, where the end product would be rendered undesirable as to taste, then the addition of such salts is of no real value. Such has been found to be the case in the beverage and confectionery business and the use of such salts of no practical value in such instances.

My invention is concerned with a product comprising proteolytically active papain which is the powdered latex of the green fruit of the papaya tree; which product can be truly and conscientiously advertised and offered to the public as containing papain in proteolytically active form and a positive aid to digestion, as well as comprising a means of preparing new and delightfully flavored products for use in the beverage and confectionery art.

One method of preparation of my proteolytically active papaya fruit extract is as follows: the ripe papaya melons are washed, peeled and cut into sections. The seeds are removed and the sections are placed in a bowl in the bottom of which are located knife-like blades rotating at a high speed such as 1500 revolutions per minute. These rapidly rotating blades quickly reduce the sections of papaya to a very fine particle size which is of a finer and more uniform consistency than possible when the melon is worked upon by a regular juicer having a high speed rotator which presses the melon against a stator and expels the juice therefrom, together with pieces of fruit.

Sugar, flavor, such as fruit extracts or in the form of essential oils, citric acid or other food acids, etc., may, if desired, be added to the finely divided payaya fruit pulp according to taste or preference. The addition of such flavoring may be postponed until later on in the process, as will be mentioned hereinafter.

The mixture is then heated to a temperature of 41° C. (105.8° F.) and held at that temperature for two hours. During this time peptonization of the proteins present takes place and a thorough breakdown or hydrolysis of the protein matter present in the mixture occurs.

The addition of dried commercial papain is possible, prior to peptonization, in proportions up to 10 parts or more to a million parts of fruit (0.001%), if it is desired to augment the proteolytic enzymatic activity of the crushed papaya fruit pulp during peptonization and to insure complete breakdown of the proteins. The expelled juice of the papaya skin or rind, or the papaya latex, from which commercial papain is obtained, may be added in lieu of the dried papain itself. Other proteinases than papain may be used also. However, in most cases the natural proteinase present in the ripe papaya fruit has been found sufficient to peptonize the proteins present. Augmenting proteinases may be used to decrease temperature and time requirements for peptonization.

The hydrolysis or breakdown of the proteins into lower molecular weight products of a more stable and permanently soluble nature creates a more easily digestible product which is far less likely to cause gastric disturbances.

The temperature is then raised to 60° C. (140° F.) at which point the natural pectins which are found in the fruit of the papaya tend to dissolve into sugars or other hydrolysis products under the action of the pectinase enzyme. Approximately one hour or up to an hour and a half is usually required for such pectinization until the pecteolytic action has broken down or hydrolyzed the pectin present into their simplest cleavage products.

Papain, itself, does not have any pectinase, or pecteolytic, properties to any degree but the pulpy papaya fruit does have such power. If desired, a suitable pectinase may be added to the mixture prior to pectinization to insure a thorough breakdown of the pectins. At the present time, however, the pectinase natural to the ripe papaya pulp has been found to be sufficient for our purposes. Added pectinase can be used to decrease the temperature and time required for pectinization.

The hydrolysis or breakdown of the pectins prevents a later gelatinization of the product which could interfere with subsequent treatments and uses.

The temperature is then raised to 70° C. (158° F.) at which point a saccharification of the starches present takes place wherein they are converted into more soluble and easily digestible products such as malt sugar. The temperature is maintained at this level for approximately one-half hour up to one hour for complete saccharification. A starch-iodine test may be employed to test for the complete removal of starch.

The latter two-stage heating process may be replaced by using a single heating at a temperature of 70° C. (158° F.) for a total of two hours, thus obviating the necessity for a pectinizing treatment in a separate stage. Such a single stage heating is to be recommended where the end product in mind is a powdered extract to be used in conjunction with opaque liquids such as milk or cream products.

The duration of the various heating treatments above described is merely given by way of example and is not intended to be limitative of the scope of the present invention. Papaya fruit varies in its composition, as does all fruit, and a longer or shorter time is frequently found necessary or possible, depending on the particular nature of the fruit being processed.

Similarly, the specific figures given for the temperature values are mere indications of preferred values. Although it is true that papain is more resistant to heat than most proteases, too high a temperature for too long a time will destroy the efficacy of the enzyme. It is best not to heat papain protease for any length of time above 45° C. (113° F.) to avoid destruction of such proteolytic activity.

The temperature is now raised to the boiling point of the liquid and the treated papaya fruit mixture may be poured into pressing bags, or wine presses, to separate the solid matter and for pressing out the clarified juice. It is to be noted that the treated juice is now superior to the untreated juice in some respects. The treated juice has an improved and stronger flavor; the proteins originally present have been broken down in the peptonization process; and the pectins and starches are similarly broken down.

If the flavoring has not been added as yet, it should be added now. It is often preferable to add such such flavorings at this time to obtain a closer control thereon and to prevent any loss or chemical change therein during the peptonization, pectinization, saccharification and boiling.

The filtered and clarified treated papaya juice is then subjected to a concentration process which is carried out by vacuum evaporation from the start so that a lower temperature may prevail during the concentrating of the juice. It is preferable that the temperature of the process never be allowed to exceed 70° C. (158° F.). Among other reasons for this is that the papaya juice contains a high sugar content and excessive heating at too high a temperature would tend to caramelize the sugar. This process may be continued to concentrate the papaya juice into a thick syrup concentrate preferably of a specific gravity approximating 1.26 (30° Baumé).

If desired, the concentrating of the liquid may be carried out in two stages, namely, a preliminary boiling thereof until a specific gravity of 1.11 (15° Baumé) is obtained. The final concentrating may then be continued in a vacuum apparatus, commonly known as an evaporator. The preferred type is commercially known as a "Cambrian" which has proved very satisfactory. The water is thus removed until the concentration of 1.26 specific gravity (30° Baumé). This heavy syrup derived from either process is then passed over drying drums also in vacuo until a dried powdered product is obtained.

This dried powdered product is actually papaya fruit in powdered form wherein the proteins have been peptonized and the pectins and starches broken down to form a thoroughly digestible product. However, no proteolytic activity can be detected therein.

Papain may now be added to the dried papaya fruit powder in proportions from 60–110 parts or more of papain to a million parts of papaya fruit powder (0.006–0.011%). The mixing is, of course, performed in the dry state and the percentages are by weight. The proportions of added papain will depend upon the tested potency of such papain. The Wahl test has been found satisfactory and where such a test revealed lower potency, more papain was added, and where the test revealed higher potency, less papain was required.

This product now contains the papaya fruit powder and the added powdered papain and is capable of use, as such, as described hereinafter.

The entire process of papaya fruit-papain preparation may be simplified by a one-stage heating process wherein the papain remains unaffected throughout to obviate the necessity of adding papain later. Such a process consists of crushing the papaya fruit, peptonizing, pectinizing, and saccharifying, and concentrating and drying under conditions wherein the use of pressure or vacuum will assist in keeping the temperature at all times below 45° C. (113.0° F.) and avoiding destruction of papain. Such a process has been tried and has been found successful although it has also been found to be considerably slower and more difficult to control and preference is for the simpler process of employing higher temperatures, up to 70° C., to the detriment of the natural papain present, and then adding the commercial papain later and separately to the powdered papaya fruit extract. The inexpensive nature of commercial papain permits such a method.

The dried papaya fruit-papain powder is mixed with powdered milk in the proportions of two-thirds papaya fruit-papain powder and one-third milk powder. Other proportions ranging from one-quarter to one-half milk powder are, of course, possible without going beyond the scope of the present invention and would merely result in variation of the richness. The mixing takes place in the dry state and should be done preferably at room temperature. Higher temperatures, such as in excess of 45° C. would have disastrous effects on the efficacy of the papaya fruit-papain-powdered milk (papaya milk) product.

This powdered product is then ready to be poured into sealed containers and shipped in such condition. The papaya milk powder may be mixed at a soda fountain, or in the home, with ice cream, milk or other dairy products to produce a delightful, highly digestible and nutritive product.

The final product thus contains the powdered papaya fruit to which has been added papain and powdered milk in separate stages. It should be understood, however, that the papain and powdered milk may be added simultaneously, or even in reverse order.

An alternative and preferred method for making the papaya fruit-papain-milk powder is to add fresh milk directly to the papaya fruit pulp which was obtained from the initial treatment by the rapidly revolving knife blades in the bowl, as above described, and to dry the pulpy papaya fruit and fresh milk to the powdered condition jointly. This method is preferred to the previously described method of drying the papaya fruit syrup and fresh milk separately and then mixing together the dried products resulting from the individual processes, and then adding papain.

When the milk is added directly to the papaya fruit pulp, the process basically continues as before but with improved results. For example, during the peptonizing treatment which is conducted at a temperature of 41° C., the protein (casein) in the milk undergoes a similar peptonization and it is broken down to become more soluble so that it will not coagulate. In this form it is far more digestible and is of greater nutritive value and is especially for consumption by children. The product of the concentrating or evaporative treatment is thus papaya fruit powder and powdered milk. The papaya is added last to the joint papaya fruit-milk extract and is thoroughly mixed in the dry state. The proportions of mix should again be on the basis of 60-110 parts of added papain to one million parts of papaya fruit powder in the papaya fruit and fresh milk extract. The product thus obtained is composed of extractive substances of the tree ripened papaya melon and of fresh milk. All protein matter originally present in either is in easily digestible form and the carbohydrates have been reduced to sugar (maltose).

When milk is mixed directly with the crushed papaya fruit, it should be fresh and in the proportions of one-third fresh milk and two-thirds papaya. The papaya pulp is approximately 7% solids and the milk is approximately 15% solids. The final end product in the dried form will comprise approximately 48.3% papaya solids and 51.7% milk solids as calculated on a dry basis, with allowance for approximately 5% moisture present.

It is, of course, apparent that various percentages of mixtures of crushed papaya fruit and fresh milk could be used. Variations which would produce differences of 10% or more in either direction from the 48.3%-51.7% have been tried and found satisfactory in varying degrees, depending upon individual taste. For example, when the percentage of papaya solids was as low as 43%, the original pleasant peach-like flavor, created when added to milk, is not quite as strong but still a very pleasant beverage for consumption and, when the percentage of papaya solids is raised to 53%, the peach-like flavor produced in milk is more noticeable and considerably stronger. Preferences have been shown by individuals for both compositions.

The preferred mixture of 48.3%-51.7% of papaya-milk extract has been tested after a storage of 18 months and found to be proteolytically active.

One of the main uses of the papain-papaya fruit-milk extract (papaya milk) in powdered form will be at soda fountains for mixture with milk, ice cream and flavoring to form a beverage or drink in somewhat analogous form to a "malted milk." Unlike "malted milk" powders which have little effect on the milk, ice cream, flavoring, etc., used in the preparation of the drink at the fountain, "papaya milk" powders do have an immediate effect thereon and do aid in digestion at once when mixed with liquids, thereby partially predigesting the casein (milk protein) and continuing such digestion in the stomach of the consumer.

I have tried the addition of papain to powdered milk and used it as such without the addition of any papaya fruit powder. This was added to milk, ice cream, flavoring, etc., but the distinctive peach-like, papaya fruit flavor was not present and the product was inferior as far as taste and flavor were concerned. Similarly, I have tried the addition of papain to dried powdered papaya fruit and used it as such without the addition of any powdered milk. This was added to milk, ice cream, flavoring, etc., but the consensus has been a preference for the addition of powdered milk.

Although the final product has always been described as existing in powdered form, it is, of course, also possible in compressed or tablet form or other commercially desired shape. Suitable inert binders, well known in the art, may be used in such manufacture.

Many other modifications and changes in the proportions of the variable elements above-mentioned will readily suggest themselves to those skilled in the art without departing from the scope of the present invention. Proportions of the improvements may be used without others.

I claim:

1. A method of making a proteolytic enzymatic preparation comprising reducing papaya fruit to a pulp, peptonizing said papaya fruit pulp, concentrating and drying said peptonized papaya fruit pulp to a powder, and adding papain having proteolytic enzyme activity to the powder at temperatures not in excess of 45° C.

2. A method of making a proteolytic enzymatic preparation comprising reducing papaya fruit to a pulp, peptonizing said papaya fruit pulp, concentrating and drying said peptonized papaya fruit pulp to a powder, and adding papain having proteolytic enzyme activity and powdered milk to the powder at temperatures not in excess of 45° C.

3. A method of making a proteolytic enzymatic preparation comprising reducing papaya fruit to a pulp, adding milk to said pulp, peptonizing said papaya fruit pulp and milk concentrating and drying said peptonized papaya fruit pulp and peptonized milk to a powder, and adding papain having proteolytic enzyme activity to the powder at temperatures not in excess of 45° C.

4. A method of making a proteolytic enzymatic preparation comprising peptonizing papaya fruit pulp, concentrating and drying said peptonized papaya fruit pulp to a powder and adding papain having proteolytic enzyme activity to the powder at temperatures not in excess of 45° C.

5. A method of making a proteolytic enzymatic preparation comprising peptonizing a mixture of papaya fruit pulp and milk, concentrating and drying said mixture to a powder and adding papain having proteolytic enzyme activity to the powder at temperatures not in excess of 45° C.

6. A method of making a proteolytic enzymatic preparation comprising adding milk to papaya fruit, peptonizing said milk and papaya fruit, concentrating and drying said milk and papaya fruit to a powder, and adding papain having proteolytic enzyme activity to the powder at temperatures not in excess of 45° C.

7. A product prepared by the process of claim 1.

8. A product prepared by the process of claim 3.

ARNOLD S. WAHL.

References Cited in the file of this patent

UNITED STATES PATENTS

| Number | Name | Date |
|--------|------|------|
| 268,245 | Lahrmann | Nov. 28, 1882 |
| 597,378 | Backhaus | Jan. 18, 1898 |
| 1,826,467 | Harteneck | Oct. 6, 1931 |
| 2,217,264 | Weizmann | Oct. 8, 1940 |
| 2,319,186 | Ingle | May 11, 1943 |

OTHER REFERENCES

Artemas Ward, "The Encyclopedia of Food," published, 1923, by the author, New York, N. Y., page 374.